United States Patent [19]

Woodring et al.

[11] Patent Number: 5,603,014

[45] Date of Patent: Feb. 11, 1997

[54] PROTECTED MODE SIMULATION OF A REAL MODE INTERUPT BASED PROGRAMMING INTERFACE IN A COMPUTER SYSTEM

[75] Inventors: Michael C. Woodring; Paul D. Crutcher, both of Beaverton, Oreg.

[73] Assignee: Intel Corporation, Santa Clara, Calif.

[21] Appl. No.: 506,323

[22] Filed: Jul. 24, 1995

Related U.S. Application Data

[63] Continuation of Ser. No. 163,366, Dec. 3, 1993, abandoned.

[51] Int. Cl.$^6$ ................................................. G06F 9/455
[52] U.S. Cl. ...................... 395/500; 364/933.8; 364/941; 364/241.2
[58] Field of Search .................... 395/500, 375, 395/795, 888

[56] References Cited

U.S. PATENT DOCUMENTS

| | | | |
|---|---|---|---|
| 4,825,358 | 4/1989 | Letwin | 395/700 |
| 4,926,322 | 5/1990 | Stimac et al. | 395/500 |
| 5,283,889 | 2/1994 | DeLisle et al. | 395/500 |
| 5,357,628 | 10/1994 | Yuen | 395/575 |
| 5,361,358 | 11/1994 | Cox et al. | 395/700 |
| 5,369,770 | 11/1994 | Thomason et al. | 395/725 |

OTHER PUBLICATIONS

"DOS Protected Mode Interface (DPMI) Specification", Intel Corporation, Application Program Interface, Version 1.0, Mar. 12, 1991.

Digital Communications Associates, Inc. and Intel Corporation "DCA/Intel Communicating Applications Specification", Version 1.2A.

Primary Examiner—David Y. Eng
Attorney, Agent, or Firm—Blakely, Sokoloff, Taylor & Zafman

[57] ABSTRACT

A method for simulating an interrupt based application programming interface in a computer system, wherein a trap driver hooks to a real mode interrupt chain comprising at least one interrupt service routine for execution in a real mode of a central processing unit. The trap driver waits for a simulated real mode interrupt, and executes an interface function in a protected mode of the central processing unit if the simulated real mode interrupt specifies the application programming interface. Otherwise, the trap driver chains the simulated real mode interrupt to a next interrupt service routine in the real mode interrupt chain.

24 Claims, 7 Drawing Sheets

PROTECTED MODE SIMULATION OF A REAL MODE INTERUPT BASED PROGRAMMING INTERFACE IN A COMPUTER SYSTEM

This is a continuation of application Ser. No. 08/163,366, filed Dec. 3, 1993 now abandoned.

BACKGROUND OF THE INVENTION

1. Field of the Invention

The present invention pertains to the field of personal computer systems. More particularly, this invention relates to protected mode simulation of a real mode interrupt based application programming interface in a personal computer system.

2. Art Background

Certain types of prior personal computer systems employ central processing units that conform to the Intel Microprocessor Architecture. Newer generations of the Intel Microprocessor Architecture provide a central processing unit that operates in a variety of modes including a real mode and a protected mode. The real mode and the protected mode are software controllable by an operating system executed by the central processing unit.

The real mode of the central processing unit provides an address space of one megabyte. The protected mode supports a full thirty-two bit programming model and provides thirty-two bit internal registers and addressing modes. The protected mode also provides on chip paged memory management functions.

One type of prior art operating system is MS-DOS from Microsoft Corporation of Redmond, Wash. The MS-DOS operating system executes in the real mode of the central processing unit.

Device driver programs under the MS-DOS operating system are typically implemented as interrupt driven resident manager programs. A typical resident manager program under the MS-DOS operating system functions as a terminate and stay resident (TSR) program. A typical DOS TSR resident manager provides a set of functions that enable access to hardware devices of the personal computer system by application programs under the MS-DOS operating system.

An application program under the MS-DOS operating system typically communicates with a DOS TSR resident manager by performing a real mode software interrupt according to a predefined application programming interface, defined by the resident manager. The real mode software interrupt transfers control to the DOS TSR resident manager. The DOS TSR resident manager typically performs a function specified by the application program, and then returns control back to the application program. Thereafter, the DOS TSR resident manager remains installed in system memory.

An operating system that executes in the protected mode can support application programs originally developed for the MS-DOS operating system if the operating system conforms to a DOS protected mode interface (DPMI) specification. The DPMI specification allows programs to access the advanced features of Intel Microprocessor Architecture in a well-behaved, hardware independent fashion that does not compromise system protection. An operating system that provides such DPMI system services is called a DPMI host. Applications that access DPMI services are called DPMI clients.

One type of prior art operating system that provides such DPMI services is the Microsoft Windows operating system. The Microsoft Windows operating system executes in the protected mode of the Intel Microprocessor Architecture central processing unit. The Microsoft Windows operating system executes on top of the MS-DOS operation system, and supplies the DPMI services necessary for simulating real mode functions of the MS-DOS operating system.

Microsoft Windows application programs commonly access the services of the DOS TSR resident managers to access hardware devices of the computer system. Such application programs typically perform real mode software interrupts to access the function services of the DOS TSR resident managers. Microsoft Windows provides DPMI services to simulate the real mode software interrupts and access the DOS TSR resident managers.

Unfortunately, the MS-DOS TSR resident managers are executed in the real mode of the central processing unit and must be loaded in system memory below the one megabyte boundary. As a consequence, the TSR resident managers take up the limited available space below one megabyte in system memory, thereby limiting the availability of system memory for launching new application programs.

In addition, such real mode execution of the DOS TSR resident managers does not take advantage of the system security mechanisms provided by the protected mode of the Intel Microprocessor Architecture. As a consequence, Microsoft Windows applications programs that employ DOS TSR resident managers are much more vulnerable to system crashes than are application programs that use protected mode device drivers.

SUMMARY AND OBJECTS OF THE INVENTION

One object of the present invention is to provide protected mode simulation of a real mode interrupt driven application programming interface in a computer system.

Another object of the present invention is to obviate the need for maintaining DOS TSR resident managers by simulating the real mode interrupt driven application programming interface.

Another object of the present invention is to simulate the real mode interrupt driven application programming interface with a protected mode device driver.

A further object of the present invention is to simulate a real mode application programming interface based upon the DOS multiplex software interrupt.

Another objective of the invention is to reduce the use of the limited memory below the 1 MB boundary, increasing overall system performance.

Another object of the present invention is to enable protected mode applications originally developed to use the services of DOS resident managers, to make use of enhanced protected mode communication manager services by trapping the DOS multiplex software interrupt and simulating the DOS communicating applications specification API.

These and other objects of the invention are provided by a method for simulating an application programming interface in a computer system. A trap driver hooks into a real mode interrupt chain in the computer system. A real mode interrupt causes at least one interrupt service routine to be executed in a real mode of a central processing unit. The trap driver waits for a simulated real mode interrupt. The real mode interrupt is generated by an application program executing on the central processing unit.

If the simulated real mode interrupt specifies the application programming interface, the trap driver executes an equivalent interface function in a protected mode of the central processing unit. The interface function is specified by parameters of the simulated real mode interrupt. If the multiplex identifier parameter does not specify the application programming interface, the trap driver chains the simulated real mode interrupt to the next interrupt service routine in the real mode interrupt chain.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
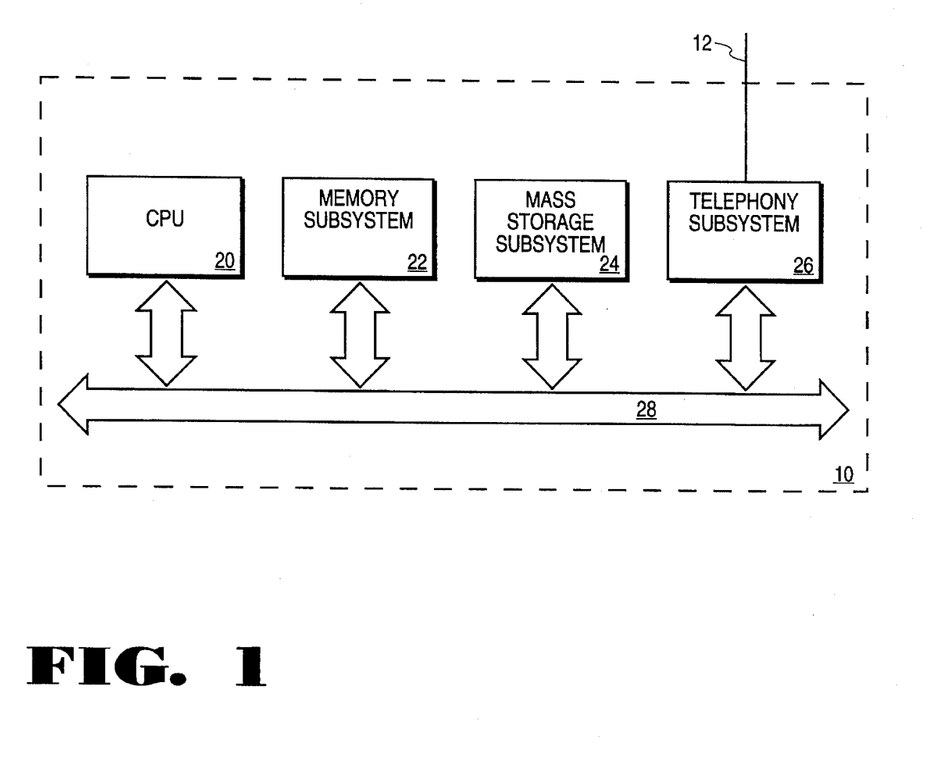
FIG. 1 illustrates a computer system for one embodiment comprising a central processing unit, a memory subsystem, a mass storage subsystem, and a telephony subsystem.

FIG. 1 illustrates a computer system 10 for one embodiment. The computer system 10 comprises a central processing unit (CPU) 20, a memory subsystem 22, a mass storage subsystem 24, and a telephony subsystem 26. The CPU 20, the memory subsystem 22, the mass storage subsystem 24, and the telephony subsystem 26 communicate over a host bus 28.

The telephony subsystem 26 enables communication over a telephone line 12. The telephony subsystem 26 may provide communication functions including fax functions, data modem functions, and telephone control functions. For another embodiment, the telephony subsystem 26 is located external to the computer system 10 and communicates to the computer system 10 through a serial port. For yet another embodiment the subsystem 26 is a communication subsystem that enables communication over a local area network.

The mass storage subsystem 24 provides large scale non volatile program and data storage for the computer system 10. The mass storage subsystem 24 represents a wide variety of mass storage devices for large scale information storage including magnetic disk drives and CD-ROM drives.

The memory subsystem 22 provides program and data storage areas for software executing on the computer system 10.

For one embodiment, the CPU 20 comprises a central processing unit that conforms to the Intel Microprocessor Architecture. The CPU 20 implements a real mode and a protected mode. In the real mode, the CPU 20 drives an address space of one megabyte over the host bus 28. In the protected mode, the CPU 20 drives an address space of thirty two megabytes over the host bus 28, and provides thirty-two bit internal registers and addressing modes. The protected mode of the CPU 20 also provides paged memory management functions.

Figure 2:
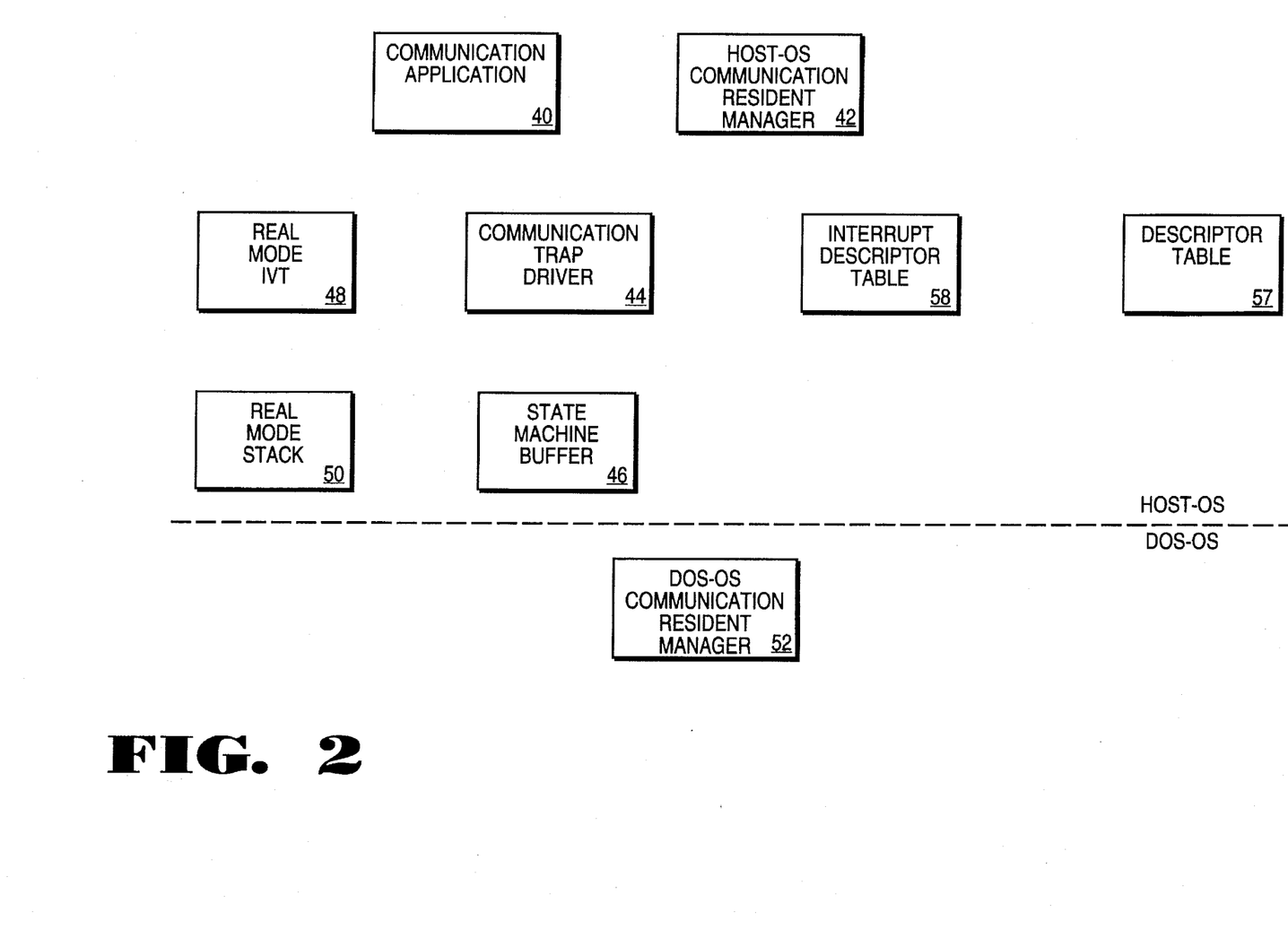
FIG. 2 illustrates the software architecture of the computer system for one embodiment which includes software elements for an MS-DOS operating system and software elements for a host operating system (HOST-OS)

FIG. 2 illustrates the software architecture for the computer system 10 for one embodiment. The software architecture for the computer system 10 includes software elements for the MS-DOS operating system (DOS-OS) and software elements for a host operating system (HOST-OS).

The HOST-OS provides services that conform to the DOS protected mode interface (DPMI) specification. The HOST-OS provides a set of DPMI system services that enable protected mode applications to access services provided by real mode software developed specifically for the DOS-OS. For further information, refer to The DPMI Committee, DOS Protected Mode Interface (DPMI) Specification, Intel Corporation, Santa Clara, Calif., Intel order no.: 240977-001.

The HOST-OS provides a set of DPMI system services for application programs executing on the CPU 20. For one embodiment, the HOST-OS is the Microsoft Windows operating system.

The HOST-OS enables application programs to access the advanced features of the protected mode of the CPU 20. The HOST-OS manages local descriptor tables, performs mode switching, allocates extended memory in the memory subsystem 22, allocates the DOS-OS memory below one megabyte in the memory subsystem 22, controls the interrupts to the CPU 20, communicates with the real mode programs in the DOS-OS memory, and reads and writes control registers of the CPU 20.

The HOST-OS installs from the DOS-OS. The HOST-OS creates a copy of the DOS-OS system software elements residing below one megabyte boundary of the memory subsystem 22. The HOST-OS creates copies of the DOS-OS system software elements including the real mode interrupt vector table of the DOS-OS.

The HOST-OS creates a real mode interrupt vector table 48 by copying the DOS-OS real mode interrupt vector table. The real mode interrupt vector table 48 provides interrupt vectors that point to the corresponding DOS-OS real mode interrupt service routines.

A DOS-OS communication resident manager 52 provides a set of communication functions for application programs on the computer system 10. The DOS-OS communication resident manager 52 performs a set of hardware device driver functions to the telephony subsystem 26. The DOS-OS communication resident manager 52 may be a terminate and stay resident (TSR) resident manager under the DOS-OS, or a real mode DOS device driver.

Application programs under the DOS-OS invoke the hardware device driver functions of the DOS-OS communication resident manager 52 through a DOS communication application programming interface (API). In addition, HOST-OS applications can access the hardware device driver functions of the DOS-OS communication resident manager 52 through the DOS communication API by employing the DPMI services of the HOST-OS.

For one embodiment, the DOS-OS communication resident manager 52 provides hardware driver functions to the telephony subsystem 26 in accordance with the DCA/Intel communicating applications specification (CAS) API.

The CAS API provides a standard programming interface that enables communication applications under the DOS-OS to access the communication functions of the telephony subsystem 26. The software that implements the CAS API is known as the CAS resident manager. The CAS resident manager controls the interface to the telephony subsystem 26.

An application submits data communication events to the CAS resident manager via the CAS API. The CAS resident manager then schedules the events and performs the necessary data transfer through the telephony subsystem 26 without further interaction with the application. An application using the CAS API does not need to maintain, or service the communications events, but may monitor an event's current status at any time. The CAS resident manager services the events for the application in the background.

The CAS resident manager provides a kernel of primitives including control files and function calls. The primitives set up data communication events, schedule the events for execution, and check the results of the events.

Applications access the CAS functions through the software interrupt 2F on DOS versions 3.0 and above. The GAS functions are accessed by loading registers with defined values, issuing an interrupt 2F, and examining the values returned in the appropriate registers. The following is an example interface for one API service:

| CPU 20 Register | Usage |
| --- | --- |
| AH | Multiplex Number |
| AL | Function Code |
| BX | Event Handle |
| CX | File Number |
| CX, DX | Date, Time |
| DS:DX | Pointer to Data Area |
| DL | Queue |
|  | 0 - Task Queue |
|  | 1 - Receive Queue |
|  | 2 - Log Queue |

The CAS resident manager supports the following types of data communication events: a send event, wherein the computer system 10 transmits information to a remote device (fax machine or computer); a receive event, wherein the computer system 10 receives information from a remote device; a polled send event, wherein the computer system 10 waits for a remote device to call and then automatically sends information to the remote device; a polled receive event, wherein the computer system 10 calls a remote device and receives information from the remote device; and group send, receive and polled events, wherein the computer system 10 communicates with multiple remote devices.

Each event corresponds to one or more control files. A control file contains event information that the CAS resident manager uses to schedule, execute, and report the status of the event. For example, the control file for a send event contains the phone number, date, and time information for the event.

An application must first create a control file for a event to initiate the event. The control file contains information such as the name of the file (or files) to send, the phone number of the destination, and the date and time for transmission. The application submits the control file for the event to the CAS resident manager and receives back a unique event handle. The application uses the event handle to track the event.

While an event is pending, the CAS resident manager maintains the control file for the event in a task queue. When the event is processed, the CAS resident manager removes the control file for the event from the task queue and sends the necessary event information to the telephony subsystem 26.

After completion of an event, the CAS resident manager updates the status information in the control file for the event, and moves the control file to a log queue. The application then uses the CAS functions to examine the control files in a receive queue and the log queue and to open received data files.

The HOST-OS software elements include a communication application 40, a HOST-OS communication resident manager 42, and a communication trap driver 44. The HOST-OS also provides a protected mode interrupt descriptor table (IDT) 58.

The communication application 40 implements high level communication functions for the computer system 10. The communication application 40 invokes device driver communication functions according to the DOS communication API. The communication application 40 invokes the device driver communication functions through the DOS communication API by executing a software interrupt 2F. The communication application 40 invokes the DPMI services of the HOST-OS to simulate the real mode software interrupt 2F.

The real mode software interrupt 2F causes the HOST-OS to direct control of the CPU 20 through the real mode interrupt vector table 48. The communication application 40 was originally developed to access the device drive functions of the DOS-OS communication resident manager 52 through the real mode software interrupt 2F.

The communication trap driver 44 intercepts the real mode software interrupt 2F generated by the communication application 40. The communication trap driver 44 redirects the function requests of the real mode software interrupt 2F to the HOST-OS communication resident manager 42 in the protected mode of the CPU 20.

The HOST-OS provides the DPMI services that enable the communication application 40 to access the DOS communication API through the real mode software interrupt 2F. The DPMI services of the HOST-OS provide simulated real mode interrupts that bypass the protected mode interrupt descriptor table 58. The simulated real mode interrupts enable the communication application 40 to access the DOS communication API through the real mode interrupt vector table 48.

The DPMI system services of the HOST-OS include system services for converting protected mode addresses to real mode addresses, and for reading and writing the real mode interrupt vectors of the real mode interrupt vector table 48. The communication trap driver 44 employs the DPMI system services to convert the protected mode addresses from the communication application 40 to real mode addresses. The communication trap driver 44 employs the DPMI system services to read and write the real mode interrupt vectors of the real mode interrupt vector table 48.

The HOST-OS saves the internal registers of the CPU 20 in a machine state buffer 46 during a simulated real mode software interrupt 2F. The DPMI system services of the HOST-OS include system services for restoring the information from the machine state buffer 46 into the internal registers of the CPU 20.

Figure 3:
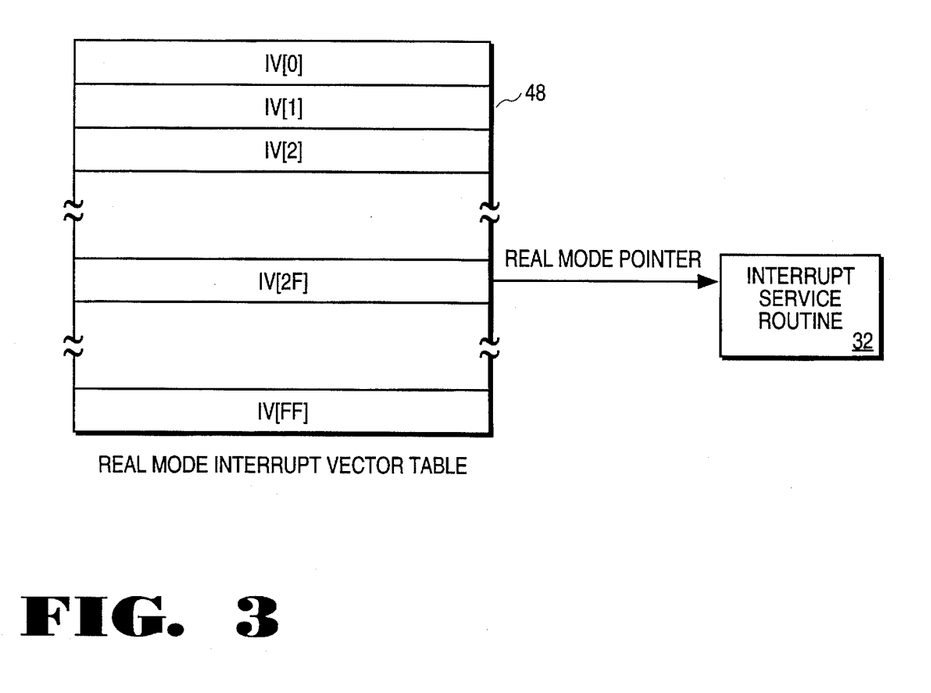
FIG. 3 illustrates a simulated real mode interrupt which directs control of the central processing unit through the real mode interrupt vector table.

FIG. 3 illustrates a simulated real mode interrupt by the HOST-OS. A simulated real mode interrupt directs control of the CPU 20 through the real mode interrupt vector table 48.

The HOST-OS initially copies the interrupt vectors IV[0]–IV[FF] from the interrupt vector table for the DOS-OS to the real mode interrupt vector table 48. Thereafter, software elements executing under the HOST-OS can read and write the real mode interrupt vector table 48 by the employing the DPMI system services of the HOST-OS.

The real mode interrupt vector table 48 contains a set of interrupt vectors IV[0]–IV[FF]. Each interrupt vector IV[0]–IV[FF] is a real mode pointer to a corresponding interrupt service routine. Each interrupt vector IV[0]–IV[FF] comprises a code segment (CS) value and an instruction pointer (IP) value. During a simulated real mode interrupt, the HOST-OS loads the CS value of the specified real mode pointer into the CS register of the CPU 20, and loads the IP value of the specified real mode pointer into the IP register of the CPU 20.

The interrupt vector IV[2F] holds a real mode pointer to an interrupt service routine 32. The execution of a software interrupt 2F causes the HOST-OS to simulate the real mode software interrupt 2F. The HOST-OS simulates the real mode software interrupt 2F by reading the real mode interrupt vector IV[2F] from the interrupt vector table 48, and transferring control to the interrupt service routine 32.

The real mode software interrupt 2F is commonly known as the multiplex interrupt of the DOS-OS. The real mode software interrupt 2F can be shared by HOST-OS drivers according to a predefined protocol for multiplexing the software interrupt 2F, wherein the AH register of the CPU 20 holds a multiplex identifier and the AL register of the CPU 20 holds a function identifier. The HOST-OS drivers that are multiplexed to the real mode software interrupt 2F comprise a multiplex interrupt chain.

A HOST-OS driver "hooks" into the multiplex interrupt chain by initially reading a current real mode pointer from the interrupt vector IV[2F] of the real mode interrupt vector table 48 using the DPMI system services of the HOST-OS. The HOST-OS driver saves the current real mode pointer. The saved current real mode pointer specifies the next multiplex interrupt service routine in the multiplex chain. The HOST-OS driver uses DPMI services to allocate a real-mode callback pointer using the protected mode address of an ISR in the HOST-OS driver. The HOST-OS driver writes a new real mode pointer to the interrupt vector IV[2F] using the DPMI system services of the HOST-OS. This pointer specifies an interrupt service routine in the HOST-OS driver.

An application program executes a real mode interrupt 2F and the HOST-OS reads an interrupt vector from the real mode interrupt vector table 48. Execution control is then transferred to an interrupt service routing specified by the interrupt vector read from the real mode interrupt vector table 48.

Figure 4:
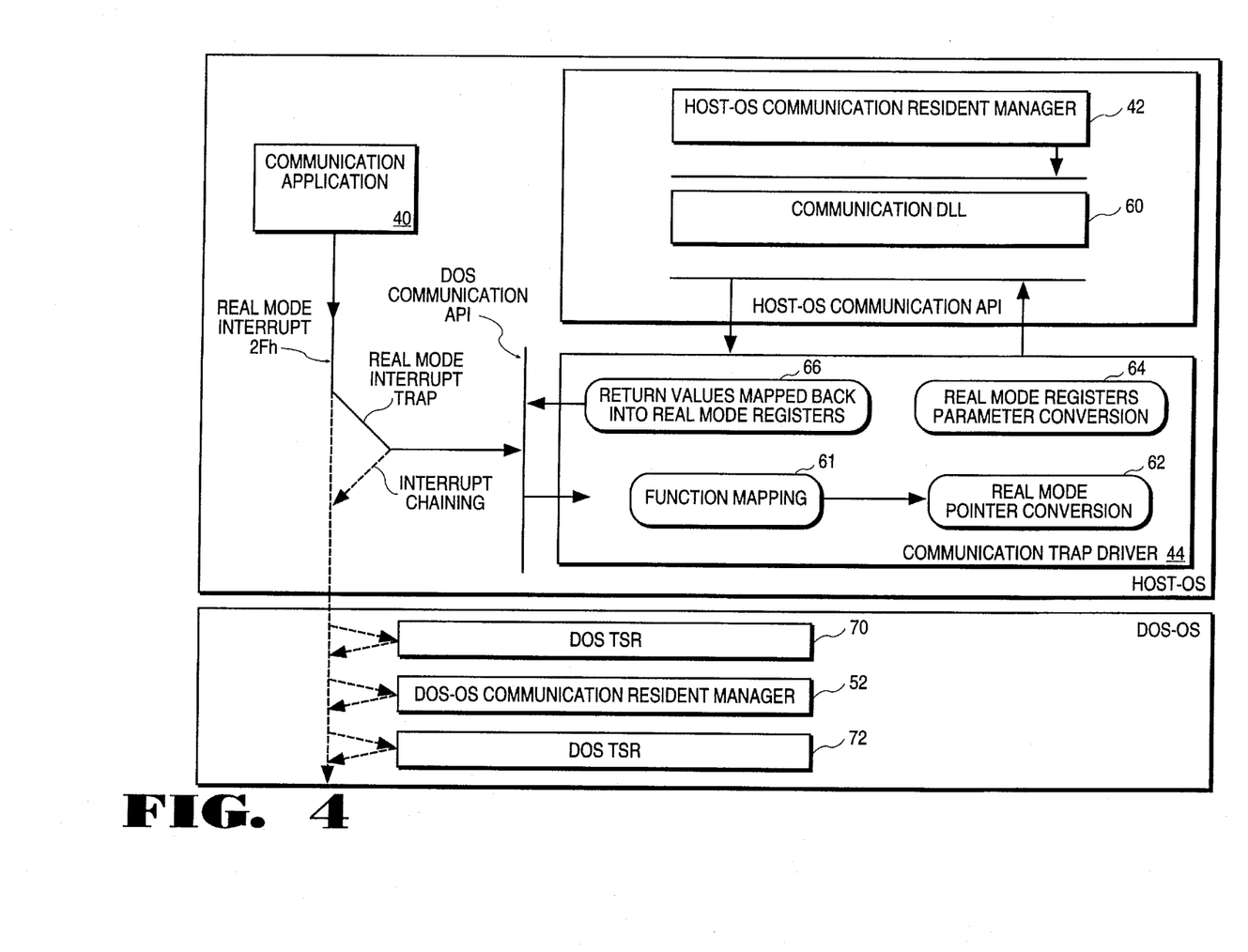
FIG. 4 illustrates the operation of the communication trap driver for one embodiment.

FIG. 4 illustrates the operation of the communication trap driver 44 for one embodiment. The communication trap driver 44 hooks into the real mode software interrupt 2F. The communication application 40 executes a real mode software interrupt 2F to access the communication functions of the telephony subsystem 26 through A DOS communication API.

The communication trap driver 44 traps the real mode software interrupt 2F and simulates the DOS communication API. The communication trap driver 44 tests the multiplex identifier for the real mode software interrupt 2F. If the multiplex identifier does not correspond to the DOS communication API, the communication trap driver 44 chains the real mode software interrupt 2F down to the ISR that was displaced, possibly all the way to the DOS-OS.

For the example shown, the communication trap driver 44 chains the real mode software interrupt 2F to a DOS TSR 70. The DOS TSR 70 chains the multiplex interrupt to the DOS-OS communication resident manager 52 if necessary, and the DOS-OS communication resident manager 52 chains the multiplex interrupt to a DOS TSR 72 if necessary. The DOS-OS communication resident manager 52 implements the DOS communication API. The communication trap driver 44 obviates the need for loading the DOS-OS communication resident manager 52.

If the multiplex identifier does correspond to the DOS communication API, then the communication trap driver 44 performs a function mapping 61 of the function identifier for the real mode software interrupt 2F. The communication trap driver 44 then performs a real mode pointer conversion function 62 on the real mode interrupt 2F parameters from the communication application 40. The communication trap driver performs a real mode register parameter conversion function 64 on the numeric parameters from the communication application 40.

The communication trap driver 44 then transfers control to the HOST-OS communication resident manager 42 through a communication dynamic link library (DLL) 60.

The communication DLL 60 returns to the communication trap driver 44 after the specified communication function is performed. The communication trap driver 44 then performs a mapping 66 of the return values from the communication resident manager 42 into the real mode registers of the CPU 20. The communication trap driver 44 then transfers control back to the communication application 40 using the DPMI system services of the HOST-OS.

Figure 5:
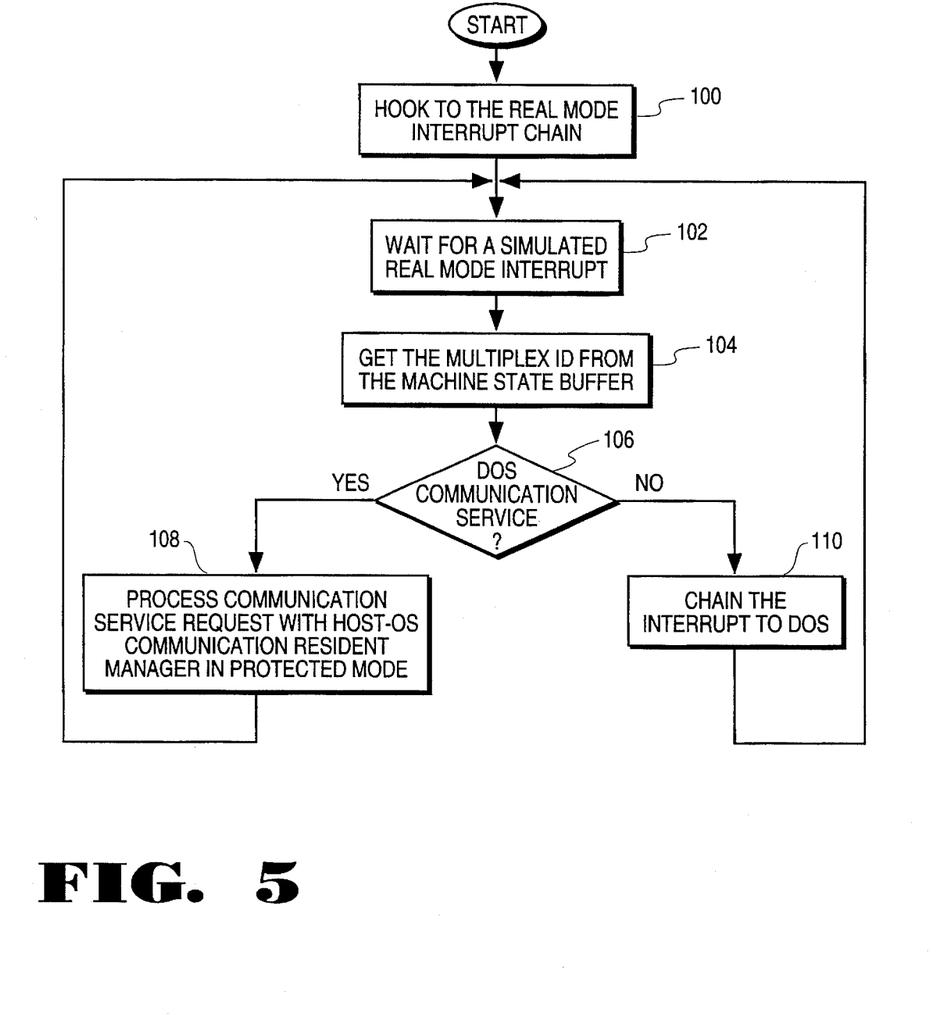
FIG. 5 is a flow diagram of the communication trap driver for one embodiment.

FIG. 5 is a flow diagram illustrating the communication trap driver 44 for one embodiment. At block 100, the communication trap driver 44 hooks to the real mode software interrupt 2F chain. The communication trap driver employs a DPMI system service of the HOST-OS to hook into the real mode software interrupt 2F calling chain. The communication trap driver 44 saves the real mode pointer to the displaced interrupt service routine in the software interrupt 2F calling chain.

At block 102, the communication trap driver 44 waits for a simulated real mode software interrupt 2F. The HOST-OS detects the real mode software interrupt 2F and stores a "snapshot" of the internal registers of the CPU 20 into the machine state buffer 46 provided by the communication trap driver 44. The HOST-OS then calls to the interrupt service routine handler of the communication trap driver 44.

Block 104 is the start of the interrupt service handler for the communication trap driver 44. At block 104, the communication trap driver 44 reads the multiplex identifier for the real mode software interrupt 2F from the machine state buffer 46. For one embodiment, the multiplex identifier is stored in a location in the machine state buffer 46 corresponding to the AH register of the CPU 20.

At decision block 106, the communication trap driver 44 determines whether the multiplex identifier corresponds to the DOS communication API. For one embodiment, the DOS communication API comprises the DOS CAS API which is specified by a multiplex identifier equal to CB hex.

At decision block 106, if the multiplex identifier does not identify the DOS communication API, then control proceeds to control block 110. At block 110, the communication trap driver 44 chains the real mode software interrupt 2F to the next interrupt service routine in the multiplex interrupt chain.

If the multiplex identifier does identify the DOS communication API at decision block 106, then control proceeds to block 108. At block 108, the communication trap driver 44 directs the real mode software interrupt 2F communications service request to the HOST-OS communication resident manager 42.

Figure 6:
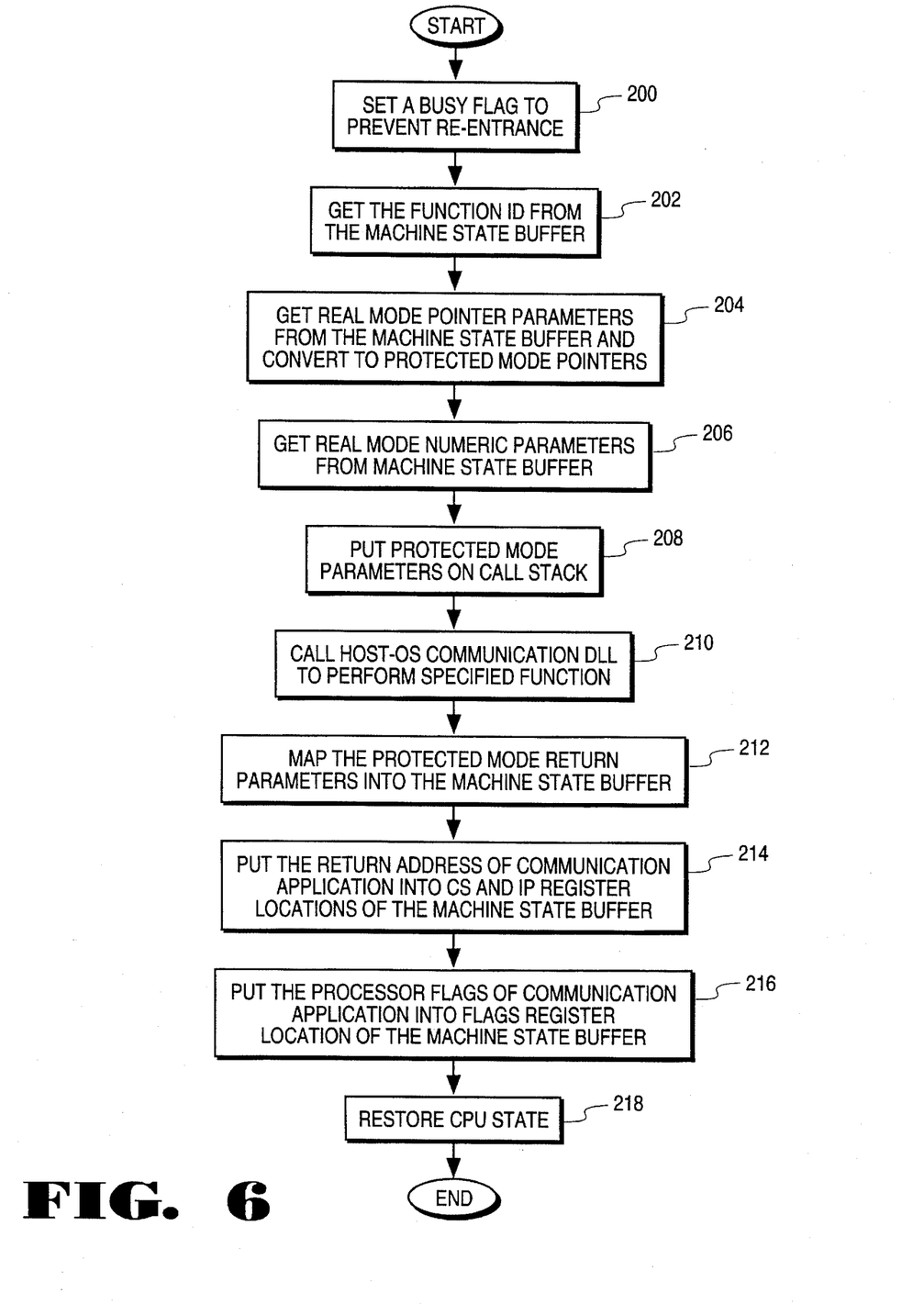
FIG. 6 illustrates the handling of a communications service request by the communication trap driver.

FIG. 6 illustrates the handling of a communications service request at block 108. While processing the service request, certain DPMI services are utilized to perform real mode to protected mode (and vice versa) data translations. Some of these services use interrupt 2F.

At block 200, the communication trap driver 44 sets a busy flag. The busy flag prevents a reentry into the communication trap driver 44 for subsequent real mode multiplex interrupts. If the communication trap driver 44 is called while the busy flag is set, the software interrupt 2F is chained to a next interrupt service routine in the multiplex interrupt 2F chain.

At block 202, the communication trap driver 44 reads the function identifier for the real mode software interrupt 2F from the machine state buffer 46. The function identifier specifies a communication service provided by the HOST-OS communication resident manager 42. For one embodiment, the function identifier is stored in a location of the machine state buffer 46 corresponding to the AL register of the CPU 20.

At block 204, the communication trap driver 44 reads the real mode pointer parameters (if any) for the specified communication service from the machine state buffer 46. The communication trap driver 44 converts the real mode pointer parameters into protected mode pointer parameters. For one embodiment, the communication trap driver 44 invokes the DPMI system services of the HOST-OS to converting real mode pointers to protected mode pointers.

A real mode pointer is comprised of a segment value and an offset value. A protected mode pointer is comprised of a selector value and an offset value. The HOST-OS converts real mode pointers to protected mode pointers according to a protected mode descriptor table 57. Each entry in the protected mode descriptor table 57 provides a set of protection parameters and specifies a memory segment in the memory subsystem 22. The protected mode descriptor table 57 is indexed by the selector value of the protected mode pointer.

For example, a real mode pointer parameter for a communication service can be a pointer to a data structure that is to be modified by the protected mode HOST-OS resident manager. The real-mode segment value stored in the machine-state buffer in the location corresponding to the DS register is used to construct a protected mode selector that may be used by the HOST-OS resident manager running in protected mode. The trap driver first allocates a protected mode selector using DPMI services. Then the real mode segment and offset values are used to make a 20 bit linear address by multiplying the segment value by 16, then adding the offset. This linear address is then passed to a DPMI service in order to set the base address of the newly allocated protected mode selector. Once the protected mode selector has been configured to address the original memory location specified by the real mode segment and selector, the real mode to protected mode conversion for the real mode pointer is complete, yielding a protected mode selector and offset pair that may be used by the protected mode HOST-OS resident manager to modify the contents of the specified data structure.

At block 206, the communication trap driver 44 reads the real mode numeric parameters for the communication function from the machine state buffer 46. The real mode numeric parameters do not require special conversion. The real mode numeric parameters correspond to the protected mode numeric parameters.

At block 208, the communication trap driver 44 places the protected mode parameters for the communication function onto a call stack. At block 210, the communication trap driver 44 calls the communication DLL 60 to perform the communication function specified by the function identifier.

At block 212, control returns back from the communication DLL 60 to the communication trap driver 44. The communication trap driver 44 maps the protected mode return parameters from the communication DLL 60 into the machine state buffer 46. For one embodiment, the return parameters are defined by the DOS CAS API specification.

At block 214, the communication trap driver 44 loads the return address of the communication application 40 into the locations of the machine state buffer 46 corresponding to the CS and the IP register of the CPU 20. The communication trap driver 44 gets the return address of the communication application 40 from a real mode stack 50. The HOST-OS placed the return address of the communication application 40 onto the real mode stack 50 during the simulation of the real mode software interrupt 2F.

At block 216, the communication trap driver 44 gets the processor flags for the communication application 40 from the real mode stack 50. The communication trap driver 44 then loads the processor flags for the communication application 40 into the flags register location of the machine state buffer 46.

At block 218, the communication trap driver 44 restores the information from the machine state buffer 46 into the CPU 20 using the DPMI system services of the HOST-OS. The HOST-OS restores execution according to the contents of the CS and the IP registers of the CPU 20. The restored execution causes control to transfer back to the return address of the communication application 40.

Figure 7:
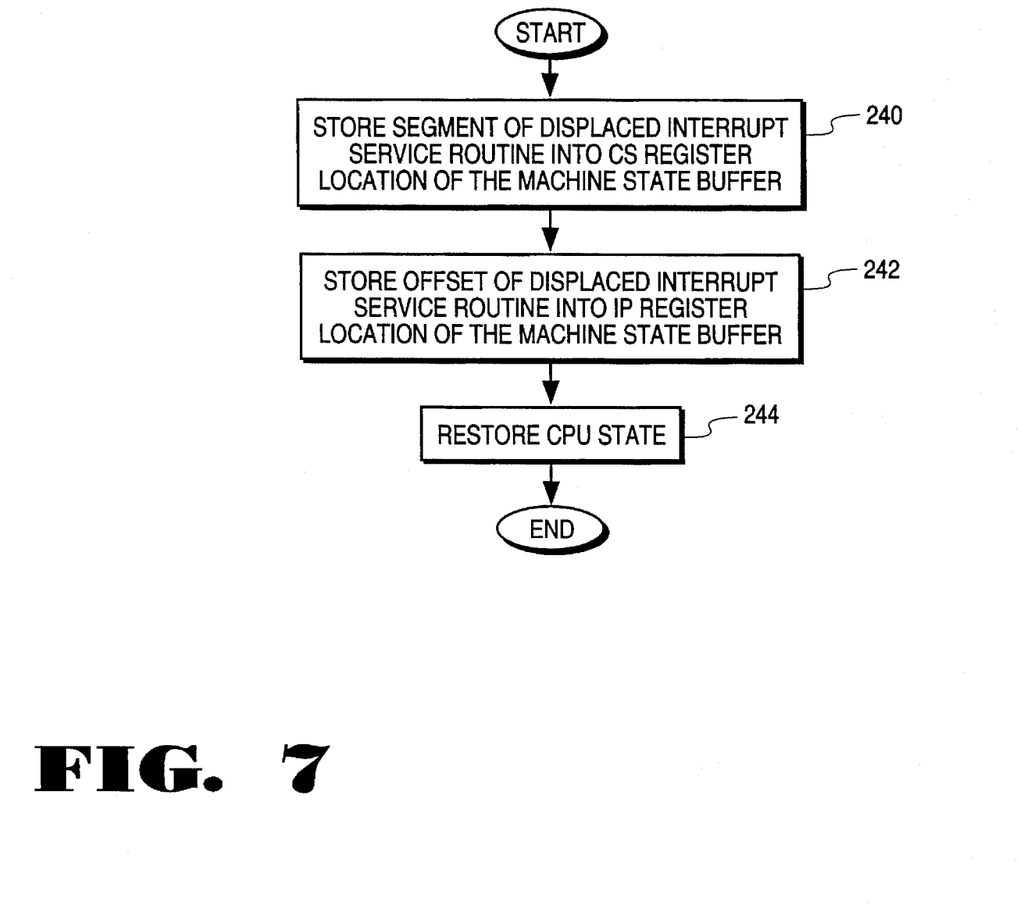
FIG. 7 illustrates the chaining of the real mode software interrupt by the communication trap driver.

FIG. 7 illustrates the chaining of the real mode software interrupt 2F by the communication trap driver 44 at block 110. The communication trap driver saved the real mode pointer for the displaced interrupt service routine at block 100.

At block 240, the communication trap driver 44 loads the segment value of the real mode pointer for the displaced interrupt service routine into the CS register location of the machine state buffer 46.

At block 242, the communication trap driver 44 loads the offset value of the real mode pointer for displaced interrupt service routine into the IP register location of the machine state buffer 46.

For this example, the segment and offset values stored into the CS and the IP registers comprise a real mode pointer to the DOS TSR 70 which is the next interrupt service routine in the DOS multiplex interrupt chain.

At block 244, the communication trap driver 44 restores the information from the machine state buffer 46 into the CPU 20 using the DPMI system services of the HOST-OS. The restored execution causes control to transfer back to the DOS TSR 70.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. In a computer system comprising a processor capable of operating in a real mode, wherein said real mode limits a usable memory address space for the processor, a method for simulating an application programming interface comprising the steps of:

trapping a shared software interrupt generated by an application program executing on said processor in the computer system, wherein the shared software interrupt is shared by a set of interrupt service routines that execute in said real mode of the processor;

if an identifier provided by the application program for the shared software interrupt specifies the application programming interface, then executing a routine that services the application programming interface in a protected mode of the processor wherein the protected mode does not limit the usable memory address space and provides memory management functions.

2. The method of claim 1, further comprising the step of invoking a next interrupt service routine of the interrupt service routines in the real mode if the identifier provided by the application program does not specify the application programming interface.

3. The method of claim 2, wherein the step of trapping a shared software interrupt generated by an application program comprises the steps of:

reading a pointer that specifies the next interrupt service routine of the interrupt service routines from a real mode interrupt vector table for the processor and saving the pointer that specifies the next interrupt service routine;

writing a pointer that specifies the routine that services the application programming interface in the protected mode to the real mode interrupt vector table.

4. The method of claim 3, wherein the shared software interrupt causes a host operating system executed by the processor to store a set of internal register data values from the processor into a machine state buffer.

5. The method of claim 4, wherein the step of executing a routine that services the application programming interface comprises the steps of:

reading a function identifier from the machine state buffer, the function identifier specifying a hardware interface function of the application programming interface;

reading a set of real mode pointer parameters from the machine state buffer and converting each real mode pointer parameter to a protected mode pointer parameter;

calling a routine of a dynamic link library to perform the hardware interface function, the dynamic link library comprising a set of driver routines that execute in the protected mode of the processor.

6. The method of claim 5, wherein the step of executing a routine that services the application programming interface further comprises the steps of:

mapping a set of return parameters from the routine of the dynamic link library into the machine state buffer;

writing a return address to the application program into the machine state buffer and restoring the machine state buffer to the processor, such that the processor returns program execution to the application program.

7. The method of claim 6, wherein the step of executing a routine that services the application programming interface further comprises the step of setting a busy flag, such that the busy flag prevents a reentry into the shared software interrupt.

8. The method of claim 7, wherein the step of invoking a next interrupt service routine of the interrupt service routines comprises the steps of:

writing the pointer that specifies the next interrupt service routine into the machine state buffer;

restoring the machine state buffer to the processor, such that the processor returns program execution to the next interrupt service routine.

9. In a computer system comprising a processor capable of operating in a real mode, wherein said real mode limits a usable memory address space for the processor, an apparatus for simulating an application programming interface, comprising:

means for trapping a shared software interrupt generated by an application program executing in the computer system, wherein the shared software interrupt is shared by a set of interrupt service routines that execute in said real mode;

means for executing a routine that services the application programming interface in a protected mode wherein the protected mode does not limit the usable memory address space and provides memory management functions if an identifier provided by the application program for the shared software interrupt specifies the application programming interface.

10. The apparatus of claim 9, further comprising means for invoking a next interrupt service routine of the interrupt service routines in the real mode if the identifier provided by the application program does not specify the application programming interface.

11. The apparatus of claim 10, wherein the means for trapping a shared software interrupt generated by an application program comprises:

means for reading a pointer that specifies the next interrupt service routine of the interrupt service routines from a real mode interrupt vector table and saving the pointer that specifies the next interrupt service routine;

means for writing a pointer that specifies the routine that services the application programming interface in the protected mode to the real mode interrupt vector table.

12. The apparatus of claim 11, wherein the shared software interrupt causes a host operating system executing on the computer system to store a set of internal register data values into a machine state buffer.

13. The apparatus of claim 12, wherein the means for executing a routine that services the application programming interface comprises:

means for reading a function identifier from the machine state buffer, the function identifier specifying a hardware interface function of the application programming interface;

means for reading a set of real mode pointer parameters from the machine state buffer and converting each real mode pointer parameter to a protected mode pointer parameter;

means for calling a routine of a dynamic link library to perform the hardware interface function, the dynamic link library comprising a set of driver routines that execute in the protected mode.

14. The apparatus of claim 13, wherein the means for executing a routine that services the application programming interface further comprises:

means for mapping a set of return parameters from the routine of the dynamic link library into the machine state buffer;

means for writing a return address to the application program into the machine state buffer and restoring the machine state buffer to the internal register data values, such that program execution returns to the application program.

15. The apparatus of claim 14, wherein the means for executing a routine that services the application programming interface further comprises means for setting a busy flag, such that the busy flag prevents a reentry into the shared software interrupt.

16. The apparatus of claim 15, wherein the means for invoking a next interrupt service routine of the interrupt service routines comprises:

means for writing the pointer that specifies the next interrupt service routine into the machine state buffer;

means for restoring the machine state buffer to the processor, such that program execution returns to the next interrupt service routine.

17. A computer system, comprising:

processor coupled for communication over a bus, the processor having a mode that limits a usable memory address space on the bus and having a protected mode that does not limit the usable memory address space and that provides memory management functions;

memory subsystem coupled to the bus, the memory subsystem storing an application program that the processor executes such that the application program generates a shared software interrupt that is shared by a set of interrupt service routines in the memory subsystem that execute in the mode that limits a usable memory address space on the bus, the memory subsystem further storing a trap driver program that traps the shared software interrupt and that invokes a routine that services an application programming interface for the application program in the protected mode if an identifier provided by the application program specifies the application programming interface.

18. The computer system of claim 17, wherein the trap driver program invokes a next interrupt service routine of the interrupt service routines in the mode that limits a usable memory address space on the bus if the identifier provided by the application program does not specify the application programming interface.

19. The computer system of claim 18, wherein the trap driver program traps the shared software interrupt by reading a pointer that specifies the next interrupt service routine of the interrupt service routines from an interrupt vector table in the memory subsystem associated with the mode that limits a usable memory address space on the bus and saving the pointer that specifies the next interrupt service routine, and by writing a pointer that specifies the routine that services the application programming interface in the protected mode to the interrupt vector table associated with the mode that limits a usable memory address space on the bus.

20. The computer system of claim 19, wherein the memory subsystem stores a host operating system executed by the processor in the protected mode such that the shared software interrupt causes the host operating system to store a set of internal register data values from the processor into a machine state buffer in the memory subsystem.

21. The computer system of claim 20, wherein the routine that services the application programming interface reads a function identifier from the machine state buffer that specifies a hardware interface function of the application programming interface, and reads a set of pointer parameters associated with the mode that limits a usable memory address space on the bus from the machine state buffer and converts each of said pointer parameters to a protected mode pointer parameter, and then calls a routine of a dynamic link library stored in the memory subsystem to perform the hardware interface function, wherein the dynamic link library comprises a set of driver routines that execute in the protected mode of the processor.

22. The computer system of claim 21, wherein the routine that services the application programming interface maps a set of return parameters from the routine of the dynamic link library into the machine state buffer, and writes a return address to the application program into the machine state buffer and restores the machine state buffer to the processor, such that the processor returns program execution to the application program.

23. The computer system of claim 22, wherein the routine that services the application programming interface sets a busy flag, such that the busy flag prevents a reentry by the processor into the shared software interrupt.

24. The computer system of claim 23, wherein the trap driver program invokes the next interrupt service routine by writing the pointer that specifies the next interrupt service routine into the machine state buffer and then restoring the machine state buffer to the processor, such that the processor returns program execution to the next interrupt service routine.

* * * * *

UNITED STATES PATENT AND TRADEMARK OFFICE
CERTIFICATE OF CORRECTION

PATENT NO. : 5,603,014
DATED : February 11, 1997
INVENTOR(S) : Woodring et al.

It is certified that error appears in the above-identified patent and that said Letters Patent is hereby corrected as shown below:

In column 5 at line 25 delete "GAS" and insert --CAS--

Signed and Sealed this

Twentieth Day of May, 1997

Attest:

BRUCE LEHMAN

Attesting Officer

Commissioner of Patents and Trademarks